US008402703B2

(12) United States Patent
Brandt et al.

(10) Patent No.: US 8,402,703 B2
(45) Date of Patent: Mar. 26, 2013

(54) MOUNTING SUPPORT FOR A PHOTOVOLTAIC MODULE

(75) Inventors: Gregory Michael Brandt, Walnut Creek, CA (US); Stephan K. Barsun, Davis, CA (US); Nathaniel T. Coleman, Oakland, CA (US); Yin Zhou, Fremont, CA (US)

(73) Assignee: SunPower Corporation, San Jose, CA (US)

( * ) Notice: Subject to any disclaimer, the term of this patent is extended or adjusted under 35 U.S.C. 154(b) by 452 days.

(21) Appl. No.: 12/625,363

(22) Filed: Nov. 24, 2009

(65) Prior Publication Data

US 2010/0146877 A1 Jun. 17, 2010

Related U.S. Application Data

(60) Provisional application No. 61/138,292, filed on Dec. 17, 2008.

(51) Int. Cl.
*E04D 13/18* (2006.01)
*E02D 27/32* (2006.01)

(52) U.S. Cl. ........................................ 52/173.3; 52/299

(58) Field of Classification Search ................ 52/173.1, 52/173.3, 169.1, 169.9, 299; 136/244; 126/600
See application file for complete search history.

(56) References Cited

U.S. PATENT DOCUMENTS

| 5,697,736 | A | * | 12/1997 | Veazey et al. | 405/284 |
|---|---|---|---|---|---|
| 5,733,382 | A | * | 3/1998 | Hanoka | 136/251 |
| 6,201,180 | B1 | * | 3/2001 | Meyer et al. | 136/244 |
| 6,525,262 | B1 | * | 2/2003 | Makita et al. | 136/244 |
| 6,672,018 | B2 | * | 1/2004 | Shingleton | 52/173.3 |
| 6,703,555 | B2 | * | 3/2004 | Takabayashi et al. | 136/244 |
| D517,006 | S | * | 3/2006 | Bessmertny | D13/102 |
| 7,454,990 | B2 | * | 11/2008 | Hardcastle, III | 73/865.6 |
| D586,737 | S | * | 2/2009 | Shugar et al. | D13/102 |
| 7,531,741 | B1 | * | 5/2009 | Melton et al. | 136/246 |
| 7,941,982 | B2 | * | 5/2011 | Merica | 52/235 |
| 2001/0050102 | A1 | | 12/2001 | Matsumi et al. | |
| 2004/0238025 | A1 | * | 12/2004 | Shingleton | 136/246 |
| 2010/0147360 | A1 | * | 6/2010 | Morse et al. | 136/246 |
| 2010/0269429 | A1 | * | 10/2010 | Belikoff et al. | 52/173.3 |
| 2011/0215213 | A1 | * | 9/2011 | Poivet et al. | 248/309.1 |

FOREIGN PATENT DOCUMENTS

| JP | 10-190035 A | | 7/1998 |
|---|---|---|---|
| JP | 11-177115 A | | 7/1999 |
| JP | 11-354823 A | | 12/1999 |
| JP | 2007077650 A | * | 3/2007 |
| JP | 2008-235766 A | | 10/2008 |
| JP | 2010168844 A | * | 8/2010 |

OTHER PUBLICATIONS

PCT International Search Report and Written Opinion of the International Searching Authority, PCT/US2009/066440 filed Dec. 2, 2009, mailed Jun. 18, 2010.
Patent Abstracts of Japan, Publication No. 11-177115, publication date Jul. 2, 1999.

(Continued)

*Primary Examiner* — Joshua Michener
*Assistant Examiner* — Elizabeth A Plummer
(74) *Attorney, Agent, or Firm* — Blakely Sokoloff Taylor Zafman LLP

(57) ABSTRACT

A mounting support for a photovoltaic module is described. The mounting support includes a foundation having an integrated wire-way ledge portion. A photovoltaic module support mechanism is coupled with the foundation.

12 Claims, 4 Drawing Sheets

OTHER PUBLICATIONS

Patent Abstracts of Japan, Publication No. 2008-235766, publication date Oct. 2, 2008.

Patent Abstracts of Japan, Publication No. 10-190035, publication date Jul. 21, 1998.

Patent Abstracts of Japan, Publication No. 11-354823, publication date Dec. 24, 1999.

Shugar, et al, "Design and Prototype of a Minimal Cost Tracking Photovoltaic Structure," Proceedings of the American Solar Energy Society Conference, Jul. 1995, 6 pgs.

International Preliminary Report on Patentability from PCT/US2009/066440 mailed Jun. 30, 2011, 6 pgs.

* cited by examiner

MOUNTING SUPPORT FOR A PHOTOVOLTAIC MODULE

CROSS-REFERENCE TO RELATED APPLICATIONS

This application claims the benefit of U.S. Provisional Application No. 61/138,292, filed Dec. 17, 2008, the entire contents of which are hereby incorporated by reference herein.

This invention was made with Government support under Contract No. DEFC36-07GO17043 awarded by the United States Department of Energy. The Government has certain rights in this invention.

TECHNICAL FIELD

Embodiments of the present invention are in the field of photovoltaic systems and, in particular, mounting supports for photovoltaic modules.

BACKGROUND

Photovoltaic cells, commonly known as solar cells, are well known devices for direct conversion of solar radiation into electrical energy. Generally, solar cells are fabricated on a semiconductor wafer or substrate using semiconductor processing techniques to form a p-n junction near a surface of the substrate. Solar radiation impinging on the surface of the substrate creates electron and hole pairs in the bulk of the substrate, which migrate to p-doped and n-doped regions in the substrate, thereby generating a voltage differential between the doped regions. The doped regions are coupled to metal contacts on the solar cell to direct an electrical current from the cell to an external circuit coupled thereto. Generally, solar cells are grouped into arrays or modules of interconnected cells mounted on a common or shared platform and electrically coupled to an electrical power distribution network to form a solar system.

Ground based solar systems require both significant cabling and foundation support. To meet electrical code, the cabling is usually placed in an expensive metal wire tray. Foundations for ground based solar systems are usually discrete and can require significant labor for on-site installation.

DETAILED DESCRIPTION

A mounting support for a photovoltaic module is described herein. In the following description, numerous specific details are set forth, such as specific measurements, in order to provide a thorough understanding of the present invention. It will be apparent to one skilled in the art that embodiments of the present invention may be practiced without these specific details. In other instances, well-known fabrication operations, such as cement mixing operations, are not described in detail in order to not unnecessarily obscure embodiments of the present invention. Furthermore, it is to be understood that the various embodiments shown in the Figures are illustrative representations and are not necessarily drawn to scale.

Disclosed herein is a mounting support for a photovoltaic module. The mounting support may include a foundation. In one embodiment, the foundation includes an integrated wire-way ledge portion. A photovoltaic module support mechanism is coupled with the foundation. A photovoltaic system may include a mounting support for a photovoltaic module having a foundation including an integrated wire-way ledge portion. In one embodiment, a photovoltaic module support mechanism is coupled with the foundation. A photovoltaic module may be coupled with the module support mechanism. In one embodiment, a set of wires or cables is coupled with the photovoltaic module and is supported by the integrated wire-way ledge portion of the foundation. A method for fabricating a mounting support for a photovoltaic module may include forming a foundation including an integrated wire-way ledge portion. In one embodiment, a photovoltaic module support mechanism is formed coupled with the foundation.

Fabrication of a mounting support for a photovoltaic module including a foundation having an integrated wire-way ledge portion may eliminate the need for a separate tray equipped to hold and route cabling for a solar system. In accordance with an embodiment of the present invention, a photovoltaic module includes a grade beam having an integrated wire-way ledge portion to provide a continuous, or nearly continuous, foundation that also serves as a wire-routing support for both DC and AC cabling. By incorporating the wire-support functionality of a tray into the foundation itself, large-scale solar system implementation costs, including field labor, may be reduced. Furthermore, in accordance with another embodiment of the present invention, the foundation and the integrated wire-way ledge portion are molded together, at the same time, during the fabrication thereof.

Figure 1A:
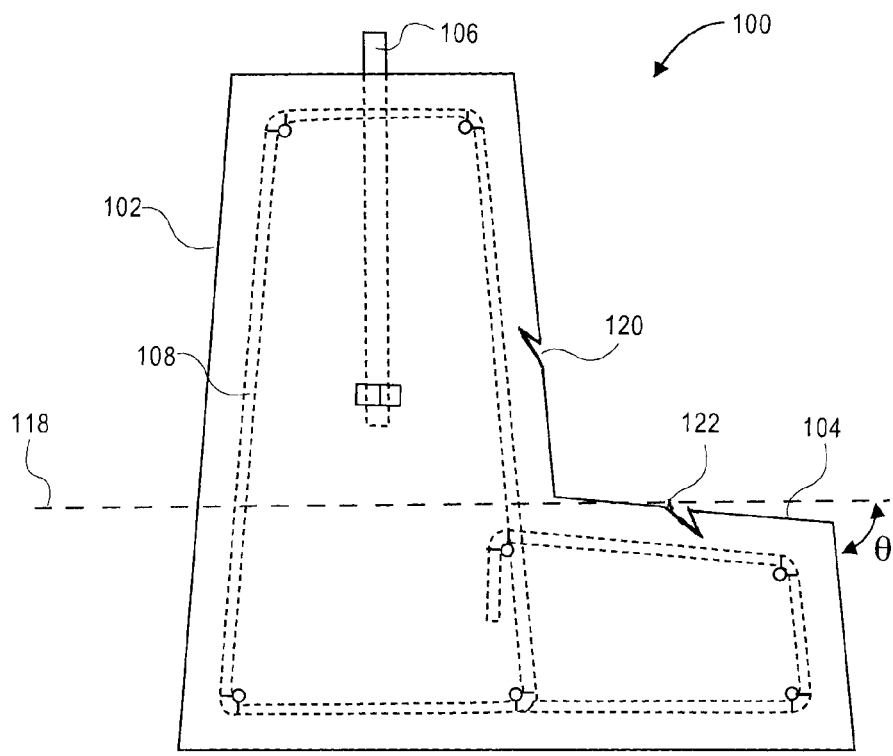
FIG. 1A illustrates a cross-sectional view of a mounting support for a photovoltaic module, including a foundation having an integrated wire-way ledge, in accordance with an embodiment of the present invention.

In an aspect of the present invention, a mounting support for a photovoltaic module is provided. FIG. 1A illustrates a cross-sectional view of a mounting support for a photovoltaic module, including a foundation having an integrated wire-way ledge, in accordance with an embodiment of the present invention.

Referring to FIG. 1A, a mounting support 100 for a photovoltaic module includes a foundation 102 having an integrated wire-way ledge portion 104. A photovoltaic module support mechanism 106 is coupled with foundation 102. In accordance with an embodiment of the present invention, foundation 102 includes a grade beam portion, as depicted in FIG. 1A. In one embodiment, foundation 102 has a horizontal axis 118, and integrated wire-way ledge portion 104 of foundation 102 is sloped downward and an angle θ, away from horizontal axis 118, as is also depicted in FIG. 1A. In a specific embodiment, the downward slope for integrated wire-way ledge portion 104 aids with drainage of rain or other moisture that collects on mounting support 100. In another embodiment, foundation 102, including integrated wire-way ledge portion 104, is adaptable to receive a cover that at least partially covers integrated wire-way ledge portion 104. In a specific embodiment, foundation 102, including integrated wire-way ledge portion 104, is adaptable at a pair of inset features 120 and 122 to receive the cover. A cover inserted into inset features 120 and 122 may be used to protect, from outside weather conditions, a set of wires or cables supported by the region of integrated wire-way ledge portion 104 covered by such a cover. Another possible configuration for receiving a cover is described in association with FIG. 2C, below. In one embodiment, foundation 102, including integrated wire-way ledge portion 104, is composed of concrete. In another embodiment, photovoltaic module support mechanism 106 includes a J-bolt. In an embodiment, foundation 102, including integrated wire-way ledge portion 104, is reinforced by an internal rebar system 108, as depicted in FIG. 1A. It is to be understood that, in certain embodiments, the specific design of internal rebar system 108 is performed on a case-by-case basis to conform to soil conditions at the specific location of implementation of mounting support 100.

Figure 1B:
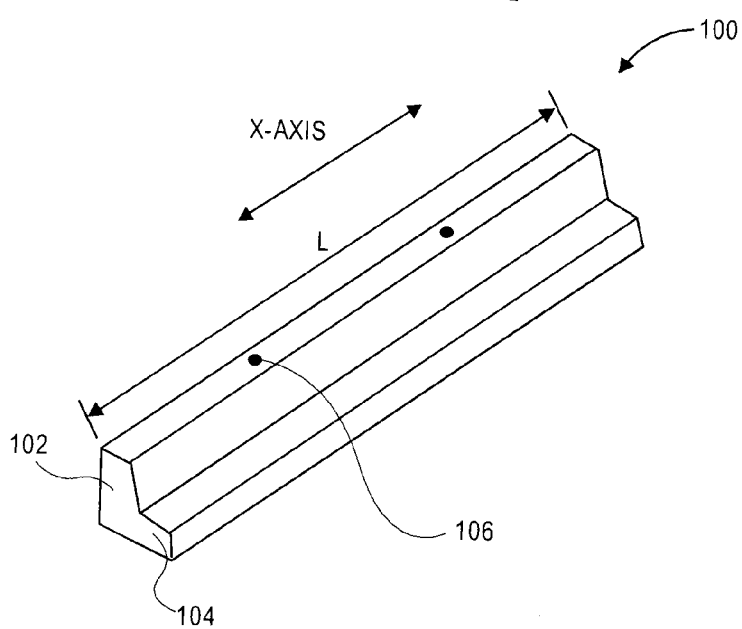
FIG. 1B illustrates an isometric view of the mounting support for a photovoltaic module of FIG. 1A, in accordance with an embodiment of the present invention.

FIG. 1B illustrates an isometric view of the mounting support of FIG. 1A, in accordance with an embodiment of the present invention. Referring to FIG. 1B, mounting support 100 for a photovoltaic module includes foundation 102 having integrated wire-way ledge portion 104. Photovoltaic module support mechanism 106 is coupled with foundation 102. In one embodiment, foundation 102 has a length, L, running parallel with integrated wire-way ledge portion 104, e.g. along the X-axis. In a specific embodiment, the length, L, is continuous (e.g., without the presence of a break or termination edge) for approximately 30 meters. In an embodiment, the foundation, including the integrated wire-way ledge portion, is continuous or discrete and has a length running parallel with the integrated wire-way ledge portion, the length approximately in the range of 2-200 meters.

It should be understood that a mounting support for a photovoltaic module need not be limited to a foundation including a downward-sloping integrated wire-way ledge portion, as described in association with FIG. 1A. FIGS. 2A-2D illustrate cross-sectional views of a variety of possibilities of arrangements for a mounting support for a photovoltaic module.

Figure 2A:
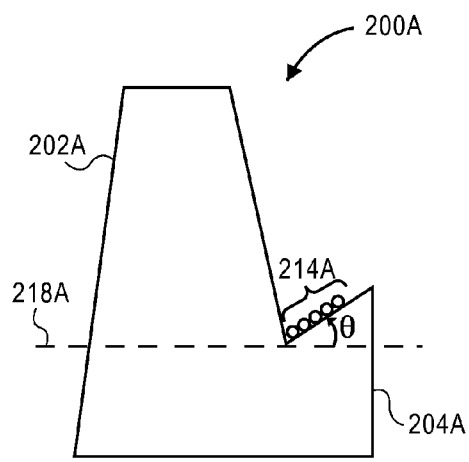
FIG. 2A illustrates a cross-sectional view of a mounting support for a photovoltaic module, including a foundation having an integrated upward-sloping wire-way ledge, in accordance with an embodiment of the present invention.

FIG. 2A illustrates a cross-sectional view of a mounting support for a photovoltaic module, including a foundation having an integrated upward-sloping wire-way ledge, in accordance with an embodiment of the present invention. Referring to FIG. 2A, a mounting support 200A for a photovoltaic module includes a foundation 202A having an integrated wire-way ledge portion 204A. A set of wires or cables 214A is supported by integrated wire-way ledge portion 204A. In an embodiment, foundation 202A has a horizontal axis 218A, and integrated wire-way ledge portion 204A of foundation 202A is sloped upward and an angle θ, away from horizontal axis 218A.

Figure 2B:
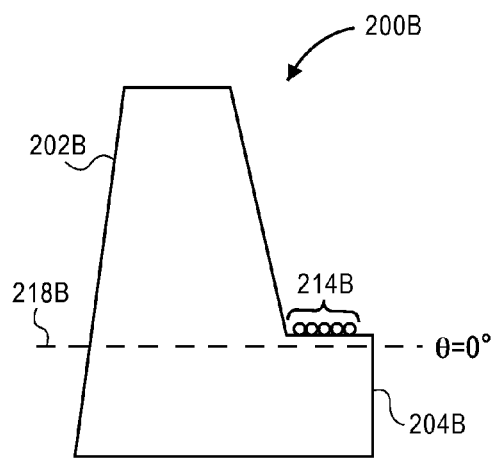
FIG. 2B illustrates a cross-sectional view of a mounting support for a photovoltaic module, including a foundation having an integrated flat wire-way ledge, in accordance with an embodiment of the present invention.

FIG. 2B illustrates a cross-sectional view of a mounting support for a photovoltaic module, including a foundation having an integrated flat wire-way ledge, in accordance with an embodiment of the present invention. Referring to FIG. 2B, a mounting support 200B for a photovoltaic module includes a foundation 202B having an integrated wire-way ledge portion 204B. A set of wires or cables 214B is supported by integrated wire-way ledge portion 204B. In an embodiment, foundation 202B has a horizontal axis 218B, and integrated wire-way ledge portion 204B of foundation 202B is approximately parallel, e.g. θ=0 degrees, with horizontal axis 218B.

Figure 2C:
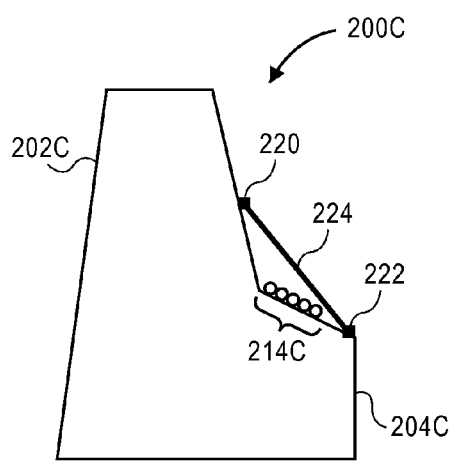
FIG. 2C illustrates a cross-sectional view of a mounting support for a photovoltaic module, including a foundation adaptable to receive a cover, in accordance with an embodiment of the present invention.

FIG. 2C illustrates a cross-sectional view of a mounting support for a photovoltaic module, including a foundation adaptable to receive a cover, in accordance with an embodiment of the present invention. Referring to FIG. 2C, a mounting support 200C for a photovoltaic module includes a foundation 202C having an integrated wire-way ledge portion 204C. A set of wires or cables 214C is supported by the region of integrated wire-way ledge portion 204C that is covered by a cover 224. In an embodiment, foundation 202C, including integrated wire-way ledge portion 204C, is adaptable at a pair of protruding, as opposed to inset, features 220 and 222 to receive cover 224. In a particular embodiment, cover 224 is composed of a material such as, but not limited to, sheet metal or a plastic. In a specific embodiment, integrated wire-way ledge portion 204C of foundation 202C is sloped downward, as depicted in FIG. 2C. In an embodiment, the configuration of both a downward-sloping cover 224 and a downward sloping integrated wire-way ledge portion 204C enhances the effective drainage of rain or other moisture that collects on mounting support 200C.

Figure 2D:
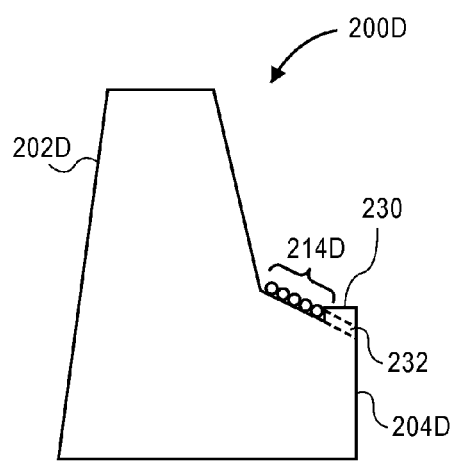
FIG. 2D illustrates a cross-sectional view of a mounting support for a photovoltaic module, including a foundation having an integrated wire-way ledge with a lip, in accordance with an embodiment of the present invention.

FIG. 2D illustrates a cross-sectional view of a mounting support for a photovoltaic module, including a foundation having an integrated wire-way ledge with a lip, in accordance with an embodiment of the present invention. Referring to FIG. 2D, a mounting support 200D for a photovoltaic module includes a foundation 202D having an integrated wire-way ledge portion 204D. In an embodiment, integrated wire-way ledge portion 204D includes a lip 230. In one embodiment, lip 230 confines, to foundation 202D, a set of wires or cables 214D supported by integrated wire-way ledge portion 204D. In another embodiment, a drainage hole 232 is disposed in lip 230. Drainage hole 232 may aid with drainage of rain or other moisture that collects on mounting support 200D. In a specific embodiment, integrated wire-way ledge portion 204D of foundation 202D is sloped downward, as depicted in FIG. 2D.

Figure 3:
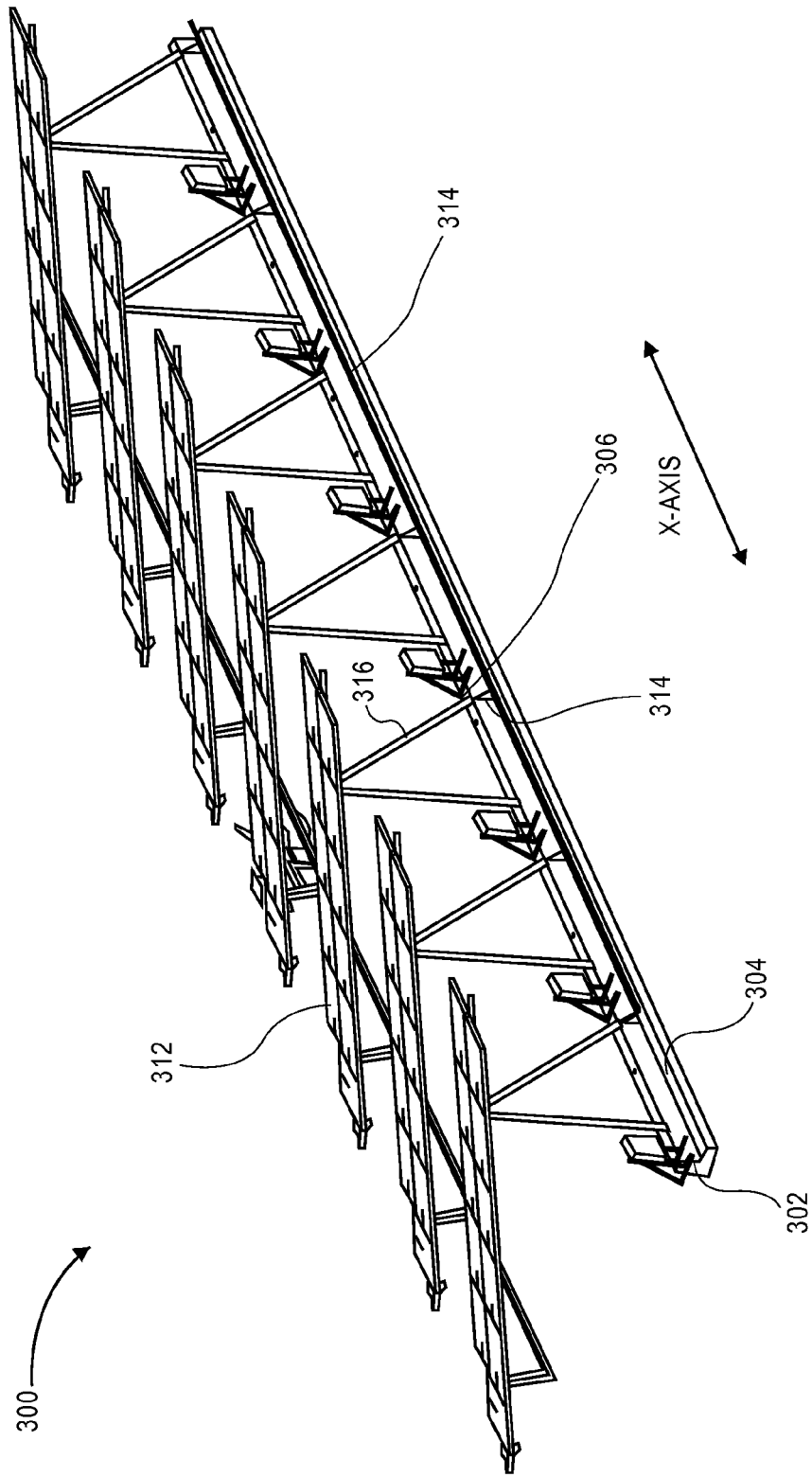
FIG. 3 illustrates an isometric view of a photo-voltaic system, including a foundation having an integrated wire-way ledge, in accordance with an embodiment of the present invention.

In another aspect of the present invention, a photo-voltaic system is provided. FIG. 3 illustrates an isometric view of a photo-voltaic system, including a foundation having an integrated wire-way ledge, in accordance with an embodiment of the present invention.

Referring to FIG. 3, a photovoltaic system 300 includes a foundation 302 having an integrated wire-way ledge portion 304. A photovoltaic module support mechanism 306 is coupled with foundation 302. A photovoltaic module 312 is coupled with photo-voltaic module support mechanism 306. In accordance with an embodiment of the present invention, a set of wires or cables 314 is further coupled with photovoltaic module 312 and supported by integrated wire-way ledge portion 304 of foundation 302, as depicted in FIG. 3.

In one embodiment, photovoltaic module 312 is coupled with photo-voltaic module support mechanism 306 by a photovoltaic tracker mechanism 316, as depicted in FIG. 3. In a specific embodiment, photovoltaic module support mechanism 306 includes a J-bolt. In another embodiment, foundation 302, including integrated wire-way ledge portion 304, is adaptable to receive a cover that at least partially covers the integrated wire-way ledge portion and that protects the set of wires or cables 314. In one embodiment, foundation 302 has a horizontal axis, integrated wire-way ledge portion 304 is sloped downward and away from the horizontal axis, and the set of wires or cables 314 is further supported by a lip of integrated wire-way ledge portion 304. In another embodiment, a strap fastened with a powder actuated pin to secure the set of wires or cables 314. In a specific embodiment, such a strap is implemented approximately every 1.5 meters along wire-way ledge portion 304. In yet another embodiment, foundation 302 has a length running parallel with integrated wire-way ledge portion, e.g. along the X-axis. In a specific embodiment, the length is continuous for approximately 30 meters. In one embodiment, foundation 302, including integrated wire-way ledge portion 304, is composed of concrete. In an embodiment, the foundation, including the integrated wire-way ledge portion, is continuous or discrete and has a length running parallel with the integrated wire-way ledge portion, the length approximately in the range of 2-200 meters.

Figure 4:
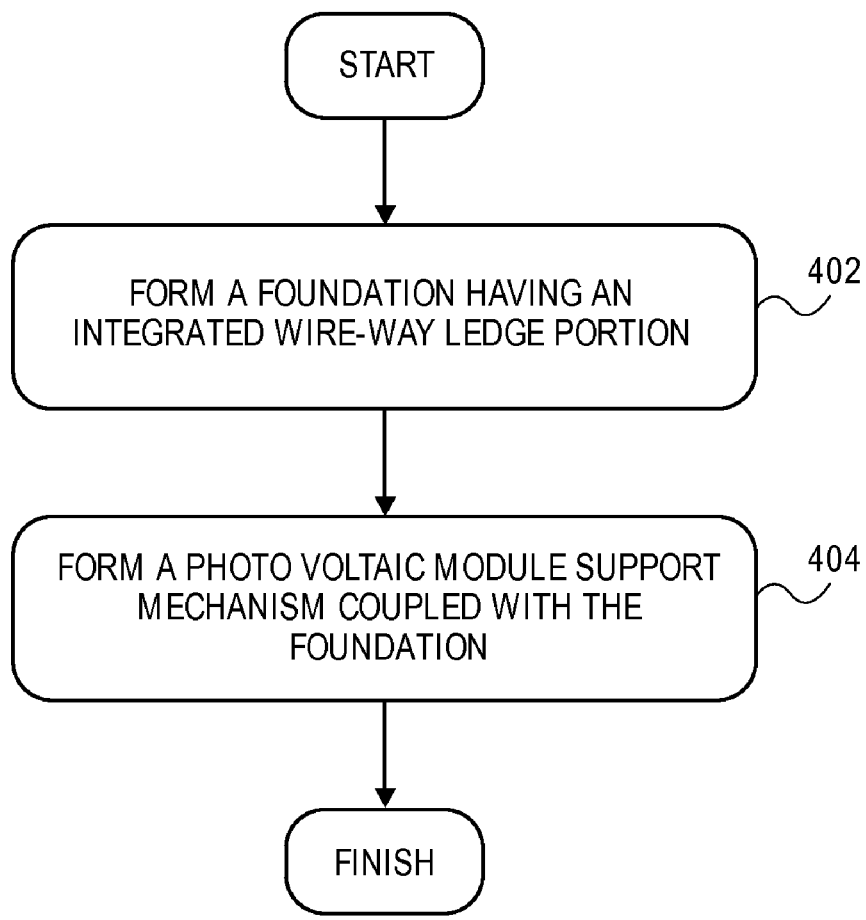
FIG. 4 depicts a Flowchart representing a series of operations in a method for fabricating a mounting support for a photovoltaic module, including a foundation having an integrated wire-way ledge, in accordance with an embodiment of the present invention.

In yet another aspect of the present invention, a method for fabricating a mounting support for a photovoltaic module is provided. FIG. 4 depicts a Flowchart 400 representing a series of operations in a method for fabricating a mounting support for a photovoltaic module, including a foundation having an integrated wire-way ledge, in accordance with an embodiment of the present invention.

Referring to operation 402 of Flowchart 400, a method for fabricating a mounting support for a photovoltaic module includes forming a foundation having an integrated wire-way ledge portion. In one embodiment, forming the foundation, including the integrated wire-way ledge portion, includes using a cast-in-place technique. In a specific embodiment, the cast-in-place technique is virtually continuous and is performed on-site versus, e.g., a discrete pre-casting technique where individual foundation units are fabricated off-site and transported to the desired location. However, in an alternative embodiment, a discrete pre-casting technique is used and the discrete units are shipped to the specific site for eventual use. In another embodiment, forming the foundation includes forming the foundation and the integrated wire-way ledge portion to be adaptable to receive a cover that at least partially covers the integrated wire-way ledge portion. In one embodiment, forming the foundation, including the integrated wire-way ledge portion, includes forming the foundation to have a horizontal axis and forming the integrated wire-way ledge portion to be sloped downward, away from the horizontal axis. In another embodiment, forming the foundation, including the integrated wire-way ledge portion, includes forming the foundation to have a length running parallel with the integrated wire-way ledge portion. In a specific embodiment, the length is continuous (e.g., without the presence of a break or termination edge) for approximately 30 meters. In an embodiment, forming the foundation, including the integrated wire-way ledge portion, includes using wet cement. The specific mixture and composition of the wet cement may be changed or optimized on a site to site, as-needed basis. In an embodiment, the foundation, including the integrated wire-way ledge portion, is formed to be continuous or discrete and to have a length running parallel with the integrated wire-way ledge portion, the length approximately in the range of 2-200 meters.

Referring to operation 404 of Flowchart 400, in accordance with an embodiment of the present invention, the method for fabricating a mounting support for a photovoltaic module further includes forming a photovoltaic module support mechanism coupled with the foundation. In one embodiment, forming the foundation, including the integrated wire-way ledge portion, includes using wet cement. In that embodiment, forming the photovoltaic module support mechanism includes incorporating the photovoltaic module support mechanism into the wet cement prior to drying to form concrete. In an alternative embodiment, forming the photovoltaic module support mechanism includes incorporating, by an epoxy process, the photovoltaic module support mechanism onto dried cement. In a specific embodiment, forming the photovoltaic module support mechanism includes incorporating a J-bolt into the foundation.

Thus, a mounting support for a photovoltaic module has been disclosed. In accordance with an embodiment of the present invention, the mounting support includes a foundation having an integrated wire-way ledge portion. A photovoltaic module support mechanism is coupled with the foundation. In one embodiment, the foundation, including the integrated wire-way ledge portion, is adaptable to receive a cover that at least partially covers the integrated wire-way ledge portion. In another embodiment, the foundation has a horizontal axis and the integrated wire-way ledge portion is sloped downward, away from the horizontal axis.

What is claimed is:

1. A photovoltaic system, comprising:
 a foundation having an L-shaped concrete footing, the footing comprising an integrated wire-way ledge portion, the integrated wire-way ledge portion having a length
 a photovoltaic module support mechanism coupled with the foundation, the photovoltaic module support mechanism comprising a J-bolt;
 a photovoltaic module coupled with the photovoltaic module support mechanism; and
 a set of wires or cables coupled with the photovoltaic module and supported by the integrated wire-way ledge portion of the foundation, the set of wires or cables running longitudinally along the length of the integrated wire-way ledge portion.

2. The photovoltaic system of claim 1, wherein the photovoltaic module is coupled with the photovoltaic module support mechanism by a photovoltaic tracker.

3. The photovoltaic system of claim 1, wherein the foundation is adapted to receive a cover that at least partially covers the integrated wire-way ledge portion and that protects the set of wires or cables.

4. The photovoltaic system of claim 1, wherein the integrated wire-way ledge portion is sloped downwardly and away from a horizontal axis, and wherein the set of wires or cables is further supported by a lip of the integrated wire-way ledge portion.

5. The photovoltaic system of claim 1, wherein the foundation, as either a continuous footing or discrete series of footings, has a length running parallel with the integrated wire-way ledge portion, and wherein the length is 2-200 meters.

6. The photovoltaic system of claim 1, wherein the foundation, including the integrated wire-way ledge portion, is fabricated by a technique selected from the group consisting of a pre-cast technique or a cast-in-place technique.

7. A method for fabricating a photovoltaic system comprising:
- mounting a foundation for a photovoltaic module,
- forming the foundation having an L-shaped concrete footing, the footing comprising an integrated wire-way ledge portion, the integrated wire-way ledge portion having a length;
- coupling a photovoltaic module support mechanism with the foundation, the photovoltaic module support mechanism comprising a J-bolt;
- coupling a photovoltaic module with the photovoltaic module support mechanism;
- coupling a set of wires or cables with the photovoltaic module; and
- running the set of wires or cables longitudinally along the length of the integrated wire-way ledge portion so that the set of wires or cables is support by the integrated wire-way ledge portion of the foundation.

8. The method of claim 7, wherein forming the foundation, including the integrated wire-way ledge portion, comprises using a technique selected from the group consisting of a pre-cast technique or a cast-in-place technique.

9. The method of claim 7, wherein forming the foundation comprises forming the foundation, is adapted to receive a cover that at least partially covers the integrated wire-way ledge portion.

10. The method of claim 7, wherein forming the foundation, including the integrated wire-way ledge portion, comprises forming the foundation to have a horizontal axis and forming the integrated wire-way ledge portion to be sloped downward, away from the horizontal axis.

11. The method of claim 7, wherein forming the foundation, including the integrated wire-way ledge portion, comprises forming the foundation to be either a continuous footing or discrete series of footings, the continuous footing or discrete series of footings having a length running parallel with the integrated wire-way ledge portion, wherein the length is 2-200 meters.

12. The method of claim 7, wherein forming the foundation, including the integrated wire-way ledge portion, comprises using wet cement, and wherein forming the photovoltaic module support mechanism comprises incorporating the photovoltaic module support mechanism into the wet cement prior to drying to form concrete.

\* \* \* \* \*